US007690606B1

(12) United States Patent
Batdorf

(10) Patent No.: US 7,690,606 B1
(45) Date of Patent: Apr. 6, 2010

(54) UNIVERSAL WORK STAND

(76) Inventor: Wes Batdorf, 932 Running Stag Way, Paso Robles, CA (US) 93446

(*) Notice: Subject to any disclaimer, the term of this patent is extended or adjusted under 35 U.S.C. 154(b) by 148 days.

(21) Appl. No.: 11/728,508

(22) Filed: Mar. 26, 2007

(51) Int. Cl.
*F16M 11/02* (2006.01)

(52) U.S. Cl. .............................. 248/181.1; 248/346.06

(58) Field of Classification Search ............ 248/123.11, 248/181.1, 288.31, 288.51, 346.06; 42/94; 89/37.02, 37.03, 37.04, 37.12; 269/75, 104, 269/265; 403/137, 76, 90
See application file for complete search history.

(56) References Cited

U.S. PATENT DOCUMENTS 1,697,117 A * 1/1929 Hilstad et al. ............... 269/265
2,260,995 A * 10/1941 Kruczek ...................... 403/90
2,458,608 A 1/1949 Lea
2,513,027 A * 6/1950 Kruczek .................. 248/181.1
3,815,892 A * 6/1974 Tulk ............................ 269/75
4,265,045 A * 5/1981 Garbini ......................... 42/94
4,408,415 A * 10/1983 Davis et al. .................. 47/40.5
4,527,339 A * 7/1985 Brunson ...................... 33/293
4,730,818 A * 3/1988 Price ........................... 267/75
4,819,359 A 4/1989 Bassett
5,375,337 A 12/1994 Butler
5,661,919 A 9/1997 Pryor
5,815,974 A * 10/1998 Keng ............................ 42/94
6,293,041 B2 * 9/2001 Weaver .......................... 42/94
6,487,807 B1 * 12/2002 Kopman et al. ................ 42/94
6,539,660 B1 * 4/2003 Yeargin ......................... 42/94
6,957,808 B2 10/2005 Varzino
7,066,457 B2 6/2006 Gerritsen
7,426,800 B2 * 9/2008 Pierce et al. .................. 42/94

* cited by examiner

*Primary Examiner*—Korie Chan
(74) *Attorney, Agent, or Firm*—Robert L. McKellar; McKellar IP Law, PLLC

(57) ABSTRACT

The universal work stand is a device that is useful for holding a pistol or other small items to assist the user in cleaning, assembly and repair. The device is mounted to any relatively flat surface. Once the device is secure to that surface the pivoting ball can accept a plurality of work piece holders such as a firearm holder, a fly tying vise, a reel vise (for holding fishing reels), fishing rod holder, pistol barrel holder or any other vise configuration that will hold a work piece. The unique pivoting ball allows for the manipulation of the ball to aid in the worker in placing the work at various angles. The ball lock is a standard locking mechanism and is also available with a quick release that can be adjusted with one hand while the other hand securely moves the work piece or the holder.

13 Claims, 16 Drawing Sheets

UNIVERSAL WORK STAND

BACKGROUND OF THE INVENTION

In U.S. Pat. No. 2,458,608 issued to Lea on Jan. 11, 1949 discloses a pistol machine rest or vise that holds a weapon for accuracy in testing of the weapon and its ammunition. This device is primarily constructed as a support for a pistol or small firearm in a natural position. This device is for testing not for cleaning or repair. The device also secures the pistol or firearm by clamping the exterior base of the grip of the weapon. The instant invention allows for the device to secure internally to the magazine area. The device is also designed to be rotatable 360° to place the weapon in any position that will facilitate cleaning, assembly or repair.

In the U.S. Pat. No. 4,819,359 issued to Bassett on Apr. 11, 1989 discloses a pistol machine rest or vise that is also designed to be used as a testing apparatus with the added feature of horizontal adjustability and a shock absorbing aspect. Again, this prior art is not produced to be used to clean, assemble or repair but for sighting and ammunition testing. The instant device is not designed for test firing or ammunition testing. The prior art here again uses an exterior clamping system where the instant invention has an adjustable internal securing apparatus.

In the U.S. Pat. No. 5,375,337 issued to Butler on Dec. 27, 1994 discloses a hand gun sighting device or vise which retains the weapon by its barrel and not the pistol grip like the first to forms of prior art. The end result is the same. The device holds the barrel securely to test the sights and then adjust them in order to make the weapon accurate in firing. Again this device is clamped to the exterior of the barrel.

In the U.S. Pat. No. 5,661,919 issued to Pryor on Sep. 2, 1997 discloses an adjustable hand gun holder. The device includes an adjustable vertical portion to rest the barrel and fore stock of the weapon upon while the pistol grip portion of the weapon rests between two external clamping units that lock the pistol grip portion in place. This device retains the weapon by the use of external clamping units, the instant invention uses an internal mounting and fastening mechanism that allows for unimpeded access to the exterior of the weapon at all times.

In the U.S. Pat. No. 6,957,808 issued to Varzino on Oct. 25, 2005 discloses an apparatus for securing a workpiece. This device also suffers the same limitations that Pryor supra does. Its securing mechanism is designed to grasp the exterior of the weapon where the instant invention once the clip of the weapon is removed slides within the area designed for the clip. This again allows the entire exterior of the weapon to be exposed and free to be worked upon.

In the U.S. Pat. No. 7,066,457 issued to Gerritsen on Jun. 27, 2006 discloses an apparatus for securing a workpiece. Again this device is limited as Pryor and Varzino are in that it does not allow for complete access to the exterior of the weapon.

THE INVENTION

A universal work stand comprising a base, a ball, a shaft and a holder. The ball is rotatably mounted within the base. This ball has a centered opening to receive the shaft. The holder has a bottom shaft portion insertable in the balls centered opening. The holder has a top half capable of holding a workpiece. The base has a means of restraining any movement of the ball in the base. The ball lock is capable of being released to permit movement of the ball.

DETAILED DESCRIPTION OF THE DRAWINGS

Figure 1:
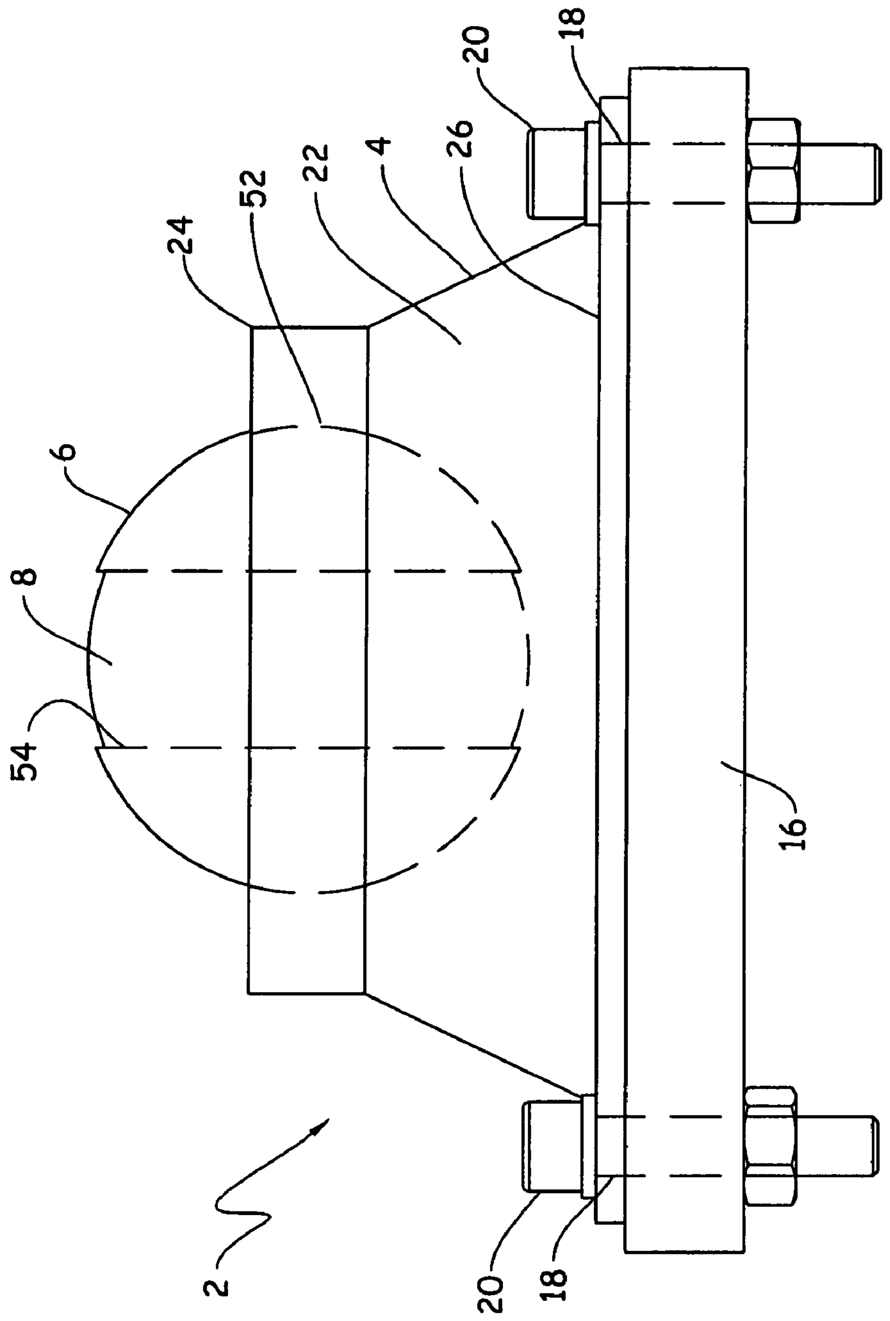
FIG. 1 is a frontal view of the universal work stand secured to a surface.

FIG. 1 is a frontal view of the universal work stand 2 secured to a surface 16. The base 4 of the universal work stand 2 is secured to a surface 16 via the base 4. The openings therethrough 18 the outside surface 22 through to the inside surface 52 of base 4 secures the universal work stand 2 in place. In this embodiment fasteners 20 are used to secure the base 4 in place. The openings therethrough 18 are located in the distal end 26 of the base 4. The near end 24 of base 4 is where the pivoting ball 6 is surmounted. The pivoting ball 6 outside surface 54 is in relative contact with the inside surface 52 of the base 4.

Figure 2:
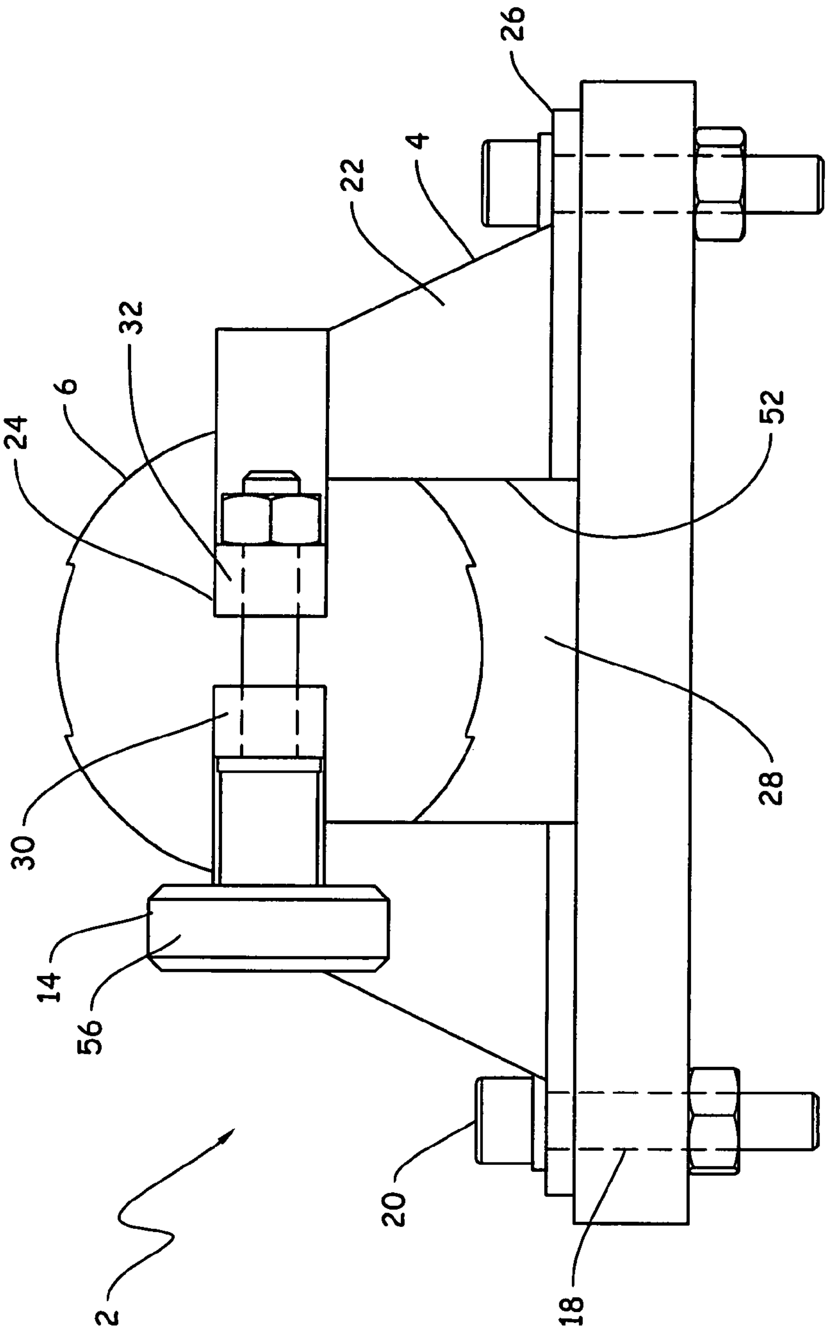
FIG. 2 is a rear view of the universal work stand showing its opening and the ball locking mechanism.

FIG. 2 is a rear view of the universal work stand 2 showing its opening 28 and ball locking mechanism 14. This view is crucial to the understanding of the ball 6 movement in relation to the ball lock 14. The opening 28 in base 4 works as a collar securing the ball 6 in relation to the degree of compression place on the locking mechanism 14, meaning that if the lock is compressed tightly the ball will not move, if the compression is medium the ball 6 movement is rigid and if the lock 14 is loose the ball 6 will move freely. The opening 28 exists from the outside surface 22 through the inside surface 52. The opening 28 also starts at the near end 24 and runs through the distal end 26 of the base 4. The ball lock 6 is located at the near end 24 of base 4. The ball lock 6 has a near end 30 and a distal end 32. The compression of the ball lock 6 is performed in a number of methods. In this embodiment a fastener 56 when rotated will increase the compression or decrease the compression whichever is desired by the operator. The compression is also capable of being performed by a quick release type compression device. The compression of the ball 6 by the ball lock 14 can be performed by any compression methods.

Again the base 4 is secured to the flat surface 16 via fasteners through opening therethrough 18.

Figure 3:
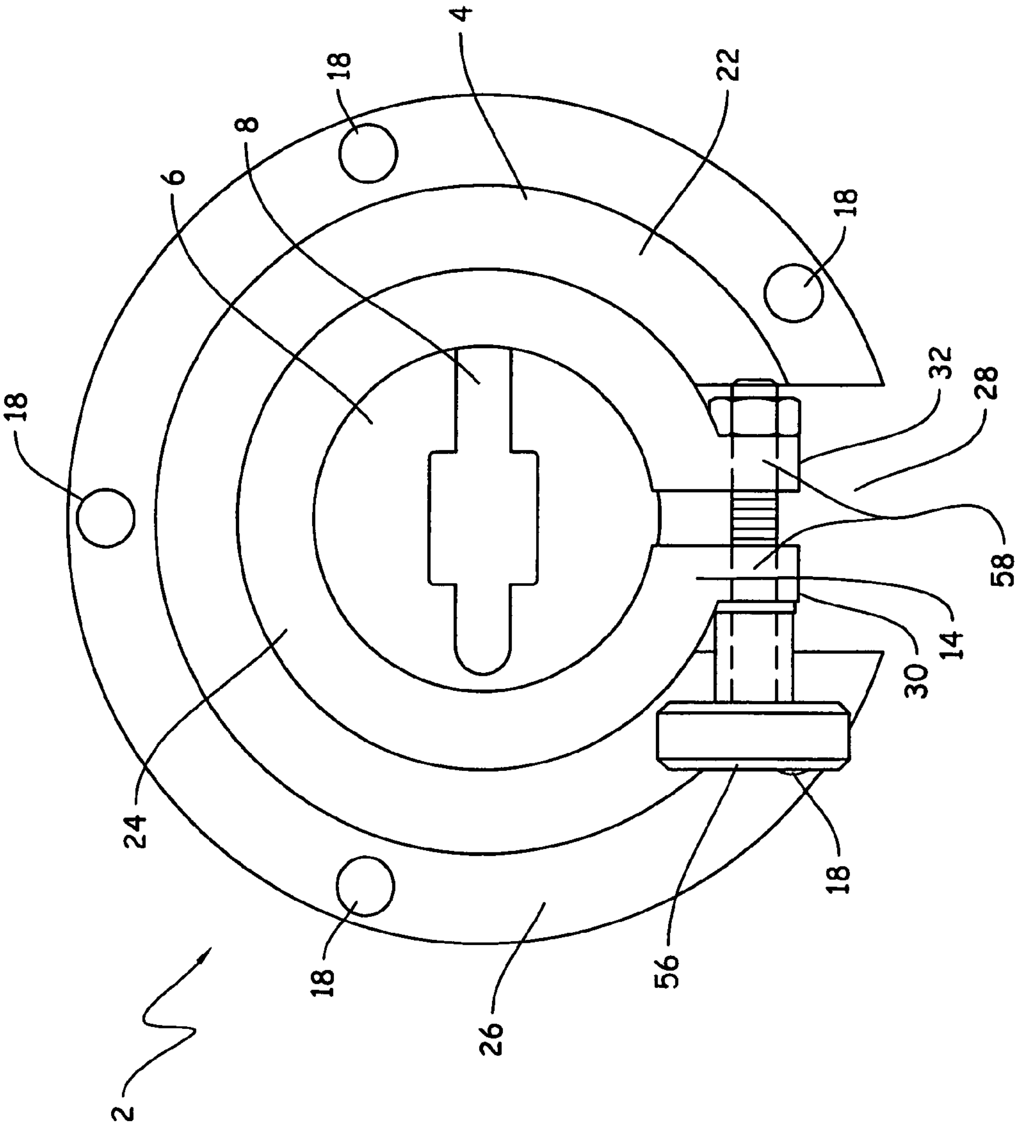
FIG. 3 is a top view of the universal work stand.

FIG. 3 is a top view of the universal work stand 2. From this view is becomes clear that the ball lock indeed works like a collar and when the ball lock 14 is tightened against ball 6 it restricts its movement thus securing the ball within the base 4. When the holder 10 (not shown) is slide into the ball opening 8 and the ball 6 is secured, the holder 10 is incapable of rotatable movement. In this embodiment there are five openings therethrough 18 at the near end 26 of the base 4. It is important to note that the base can be secure to a surface 16 (not shown) in any manner that is suitable for securing the base 4 to a surface 16 (not shown). The ball 6 is secured in the near end 24 of the base 4. The ball lock 14 near end 30 is connected to the distal end 32 via a lock fastener 56 this fastener extends through the fastener openings 58. When the fastener 56 is rotated to tighten or loosen the compression placed on the pivoting ball 6 by increasing or decreasing the distance of the opening 28 in the base 4. To decrease the distance of opening 28 will place more compression upon the ball 6 therefore restricting its ability to move and rotating the fastener in a manner that increases the distance of opening 28 reduces the compression upon the ball 6 therefore allowing the ball 6 to move less restricted. Also shown is the outside surface 22 of base 4.

Figure 4:
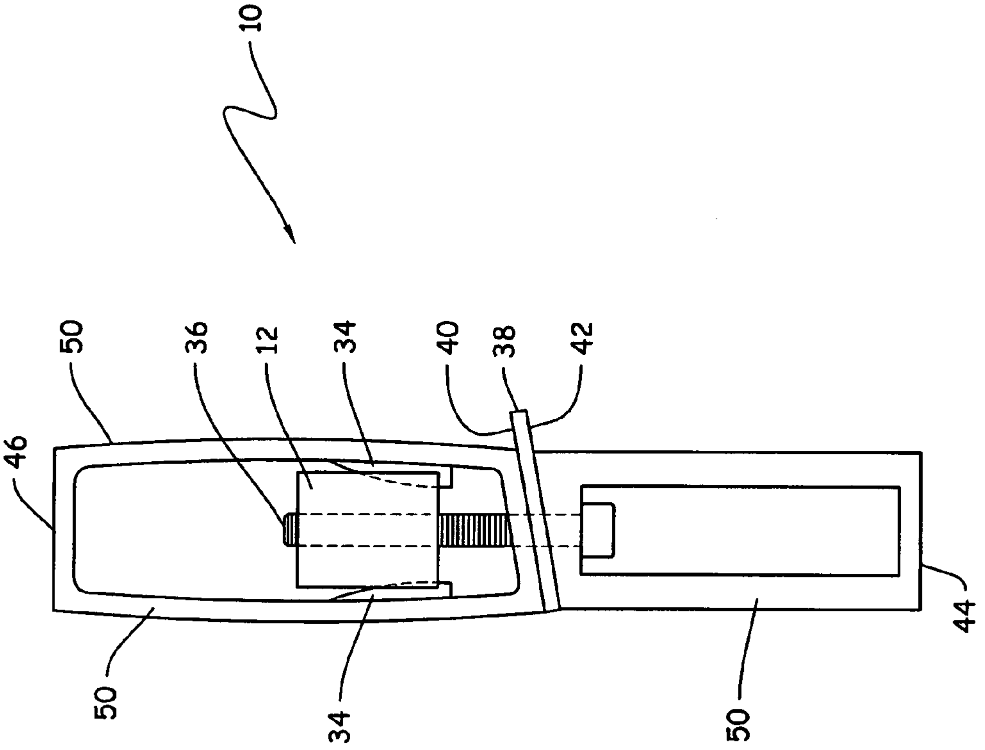
FIG. 4 is a side view of the holder with outside surface expanded.

FIG. 4 is a side view of the holder 10 with outside surface 50 expanded. With the clip or magazine removed from the weapon 48 (not shown) the inside surface 60 of the weapon 48 slides over the outside surface 50 of holder 10 sliding downward until it stops against the rest 38. The weapon 48 makes contact with the top surface 40 of the rest 38 and the bottom surface 42 faces the ball 6. The distal end 46 of the holder 10 is secured within the weapon 48 (not shown) by rotating the threaded rod 36 of the holder compression wedge 12. As the wedge 12 slides downward on the compression wedge rails 34 the wedge 12 expands the outside surface 50 placing pressure against the inside surface 60 of the weapon 48 then weapon 48 becomes secured to the holder 10. Once the weapon 48 is secured to the holder 10, the near end 44 of holder 10 slides within the ball opening 8 of ball 6 and is retained within that opening 8 (seen in FIG. 6).

Figure 5:
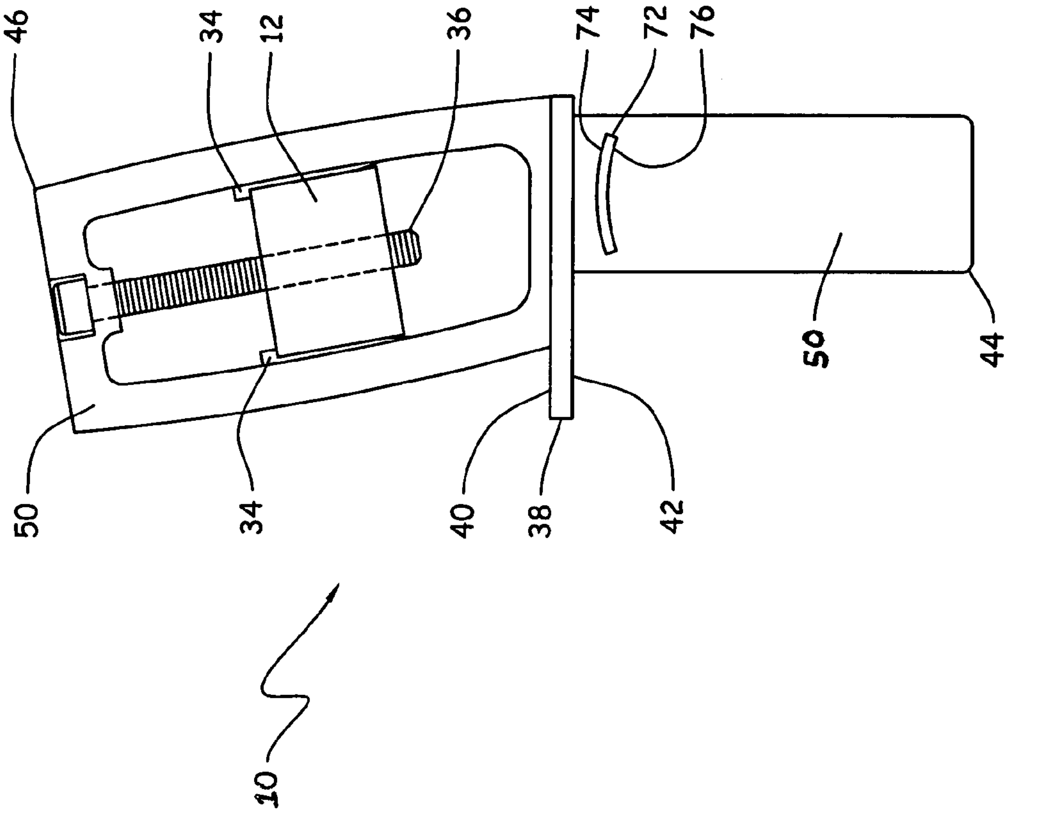
FIG. 5 is a side view of another embodiment of the holder.

FIG. 5 is a side view of another embodiment of the holder 10. This embodiment also uses the compression wedge 12 but the adjustment of the compression wedge 12 is done through the breach of the weapon 48 or from the distal end 46 of the holder 10. This embodiment requires that the weapon 48 clip or magazine be removed and the weapon 48 is placed over the holder 10 and coming to rest upon the top surface 40 of the rest 38. Then the threaded rod 36 is manipulated from the distal end 46 of the holder 10 moving the compression wedge 12 upward along the rails 34 expanding the outside surface 50 of the holder 10 securing the weapon 48 upon the holder 10. The holder 10 is inserted into the ball 6 where the near end 44 and outside surface 50 of holder 10 is placed into the ball opening 8 and secured within the ball 6. Also present on the near end 44 of holder 10 is the holder stop 72 which has a top surface 74 and a bottom surface 76. When the holder 10 is inserted into the ball opening 8 the bottom surface 76 of the stop 72 comes to rest upon the top surface 62 of ball 6 preventing the holder from extending any further within the ball 6.

Figure 6:
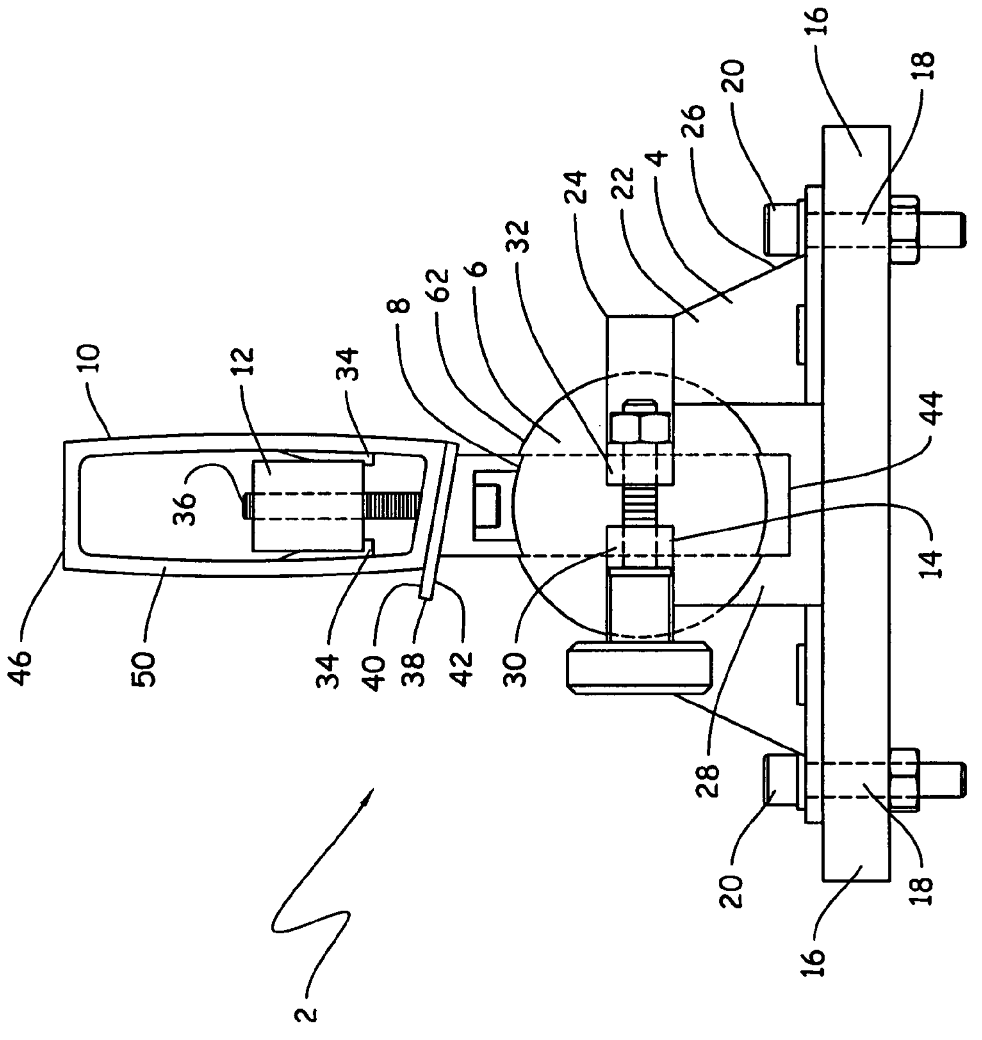
FIG. 6 is a rear view of the universal work stand with a holder inserted into the pivoting ball.

FIG. 6 is a rear view of the universal work stand 2 with a holder 10 inserted into the pivoting ball 6 through ball opening 8. The base 4 of the universal work stand 2 is secured to a flat surface 16 via the base fasteners 20 through the openings therethrough 18 of the distal end 26 of base 4. The ball 6 is secured in the near end 24 of the base 4 by the ball lock 14. The ball lock 14 has a near end 30 and a distal end 32. There are openings through each the distal and near ends of the ball lock 14. These openings are on a horizontal plane and incorporate a fastener 56 in this embodiment. When the fastener 56 is rotated the ball lock responds in accordance to the direction of the rotation. A right rotation compresses the lock and a rotation to the left loosens the lock. This is possible because of the opening 28 in the base 4. As the distance of the opening 28 is reduced the more compression is place upon the ball 6 and as the distance of the opening 28 increases the less compression is placed upon the ball 6 allowing it to move more freely.

The top surface 62 of the ball 6 contains an opening 8 that accommodates the holder 10. It should be noted that the opening 8 sizes and shapes are dictated by the specific device to be secured within the ball 8. In this embodiment the shape is slotted to accept the holder 10 for use with firearms, specifically automatic pistols or pistols that require a clip or magazine insertable through the bottom of the pistol grip. The distal end 46 of holder 10 is inserted into the weapon (not shown) with the inside surface of the weapon 60 making contact with the outside surface 50 and stopping at the top surface 40 of the rest 38 of the holder 10. The threaded rod 36 is rotated moving the compression wedge 12. As the wedge 12 moves along the rails 34 it compresses against the inside surface 60 of the weapon securing it to the holder 10. The bottom surface 42 of the rest 38 now is facing the outside surface 22 of the base 4. The weapon 48 (not shown) is now secured and the ball can be manipulated to position the weapon in a position that best facilitates the activity that the user is ready to perform.

Figure 7:
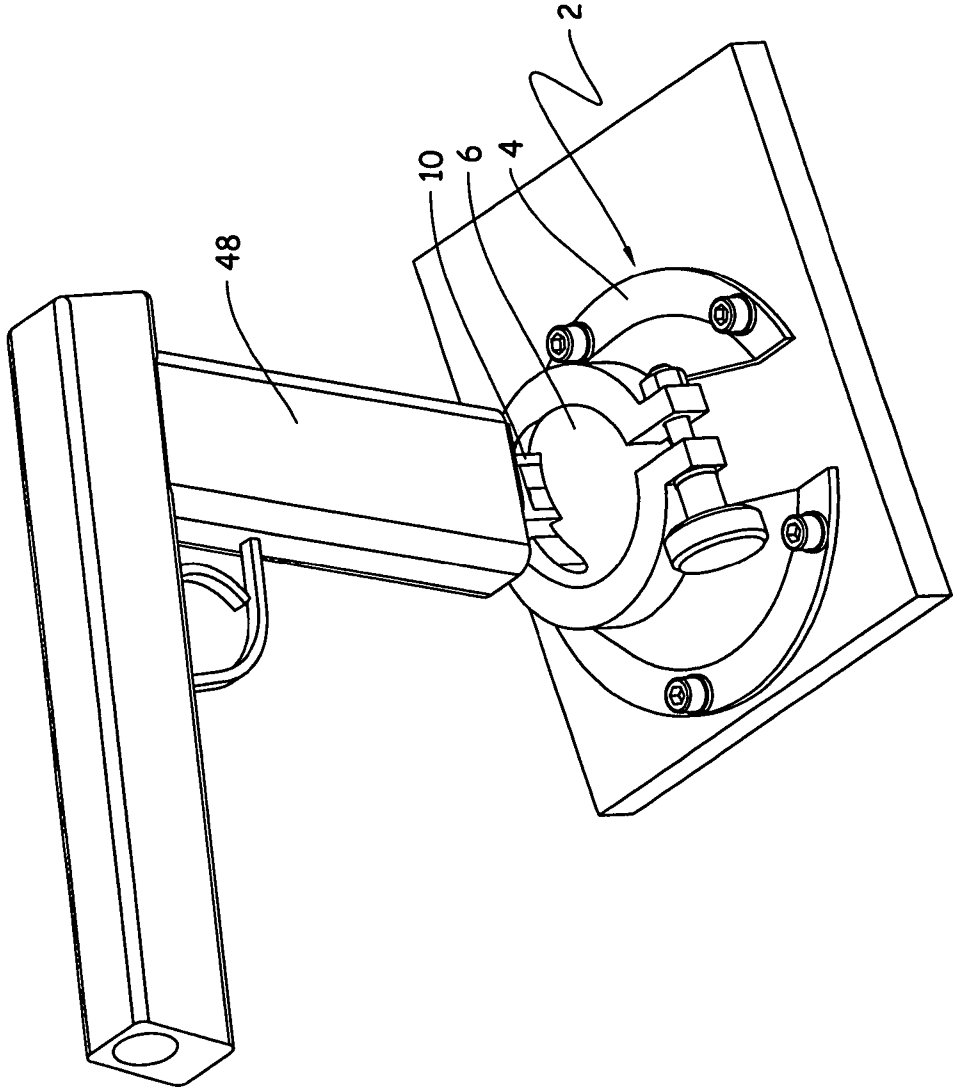
FIG. 7 is a rear view of the universal work stand with a holder inserted into the pivoting ball with a weapon secure to the holder.

FIG. 7 is a rear view of the universal work stand 2 with a holder 10 inserted into the pivoting ball 6 with a weapon 48 secure to the holder 10.

Figure 8:
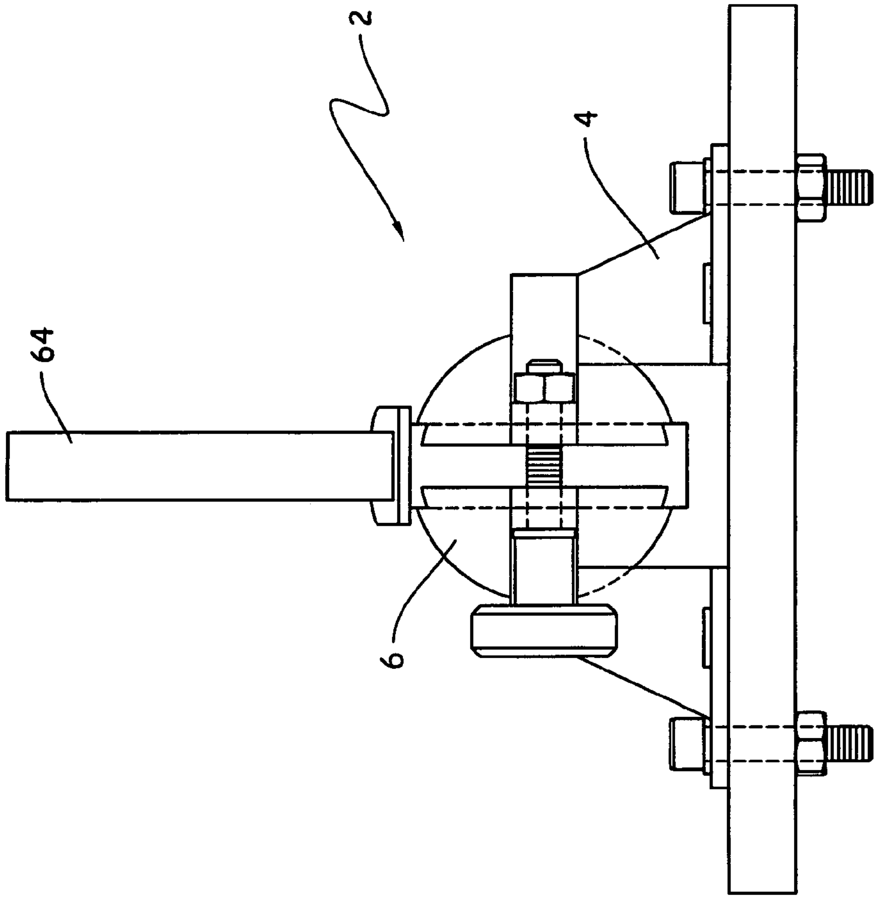
FIG. 8 is a front view of the universal work stand with a pistol barrel holder inserted into the ball.

FIG. 8 is a front view of the universal work stand 2 with a pistol barrel holder 64 inserted into the opening 8 of ball 6.

Figure 9:
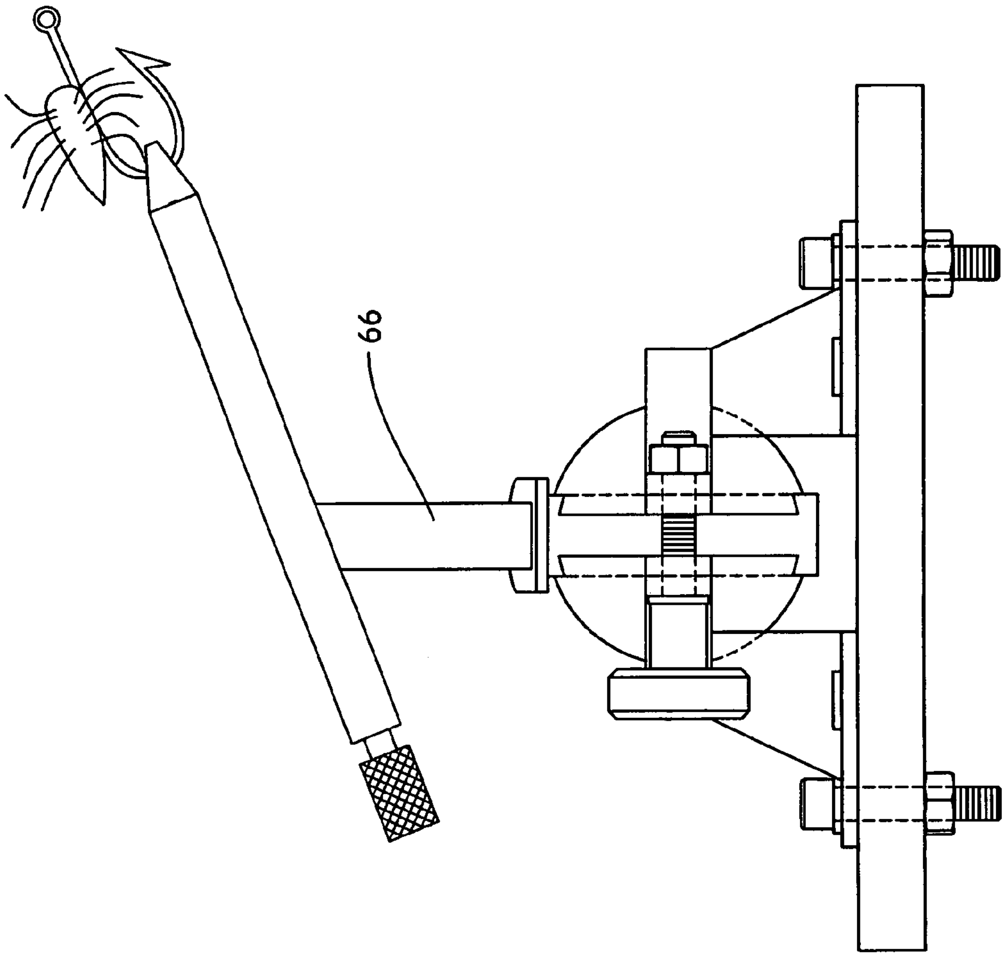
FIG. 9 is a side view of the universal work stand with a fly tying vise inserted into the ball.

FIG. 9 is a side view of the universal work stand 2 with a fly tying vise 66 inserted into the opening 8 of ball 6.

Figure 10:
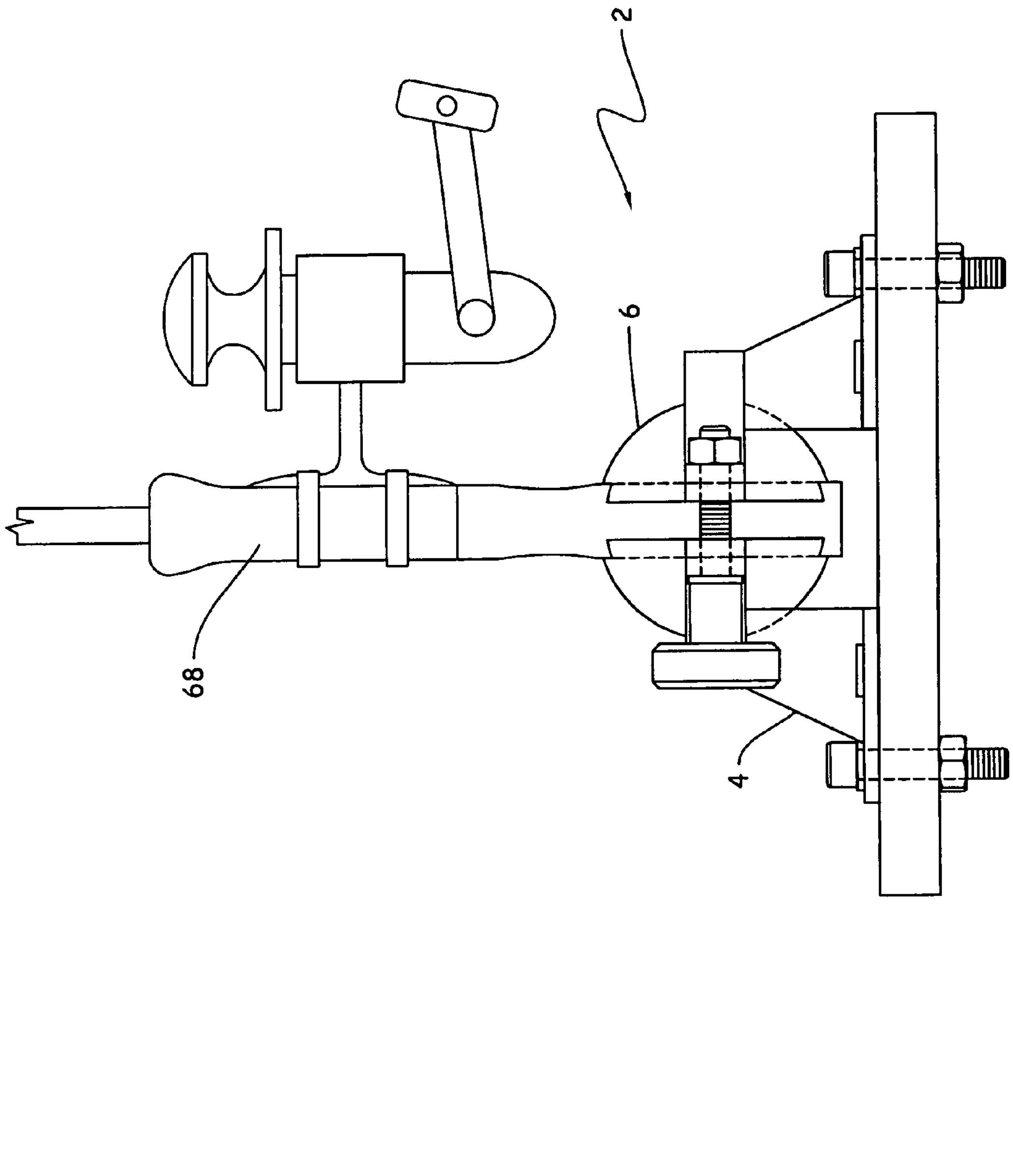
FIG. 10 is a side view of the universal work stand with a fishing rod inserted into the ball.

FIG. 10 is a side view of the universal work stand 2 with a fishing rod 68 inserted into the opening 8 of ball 6.

Figure 11:
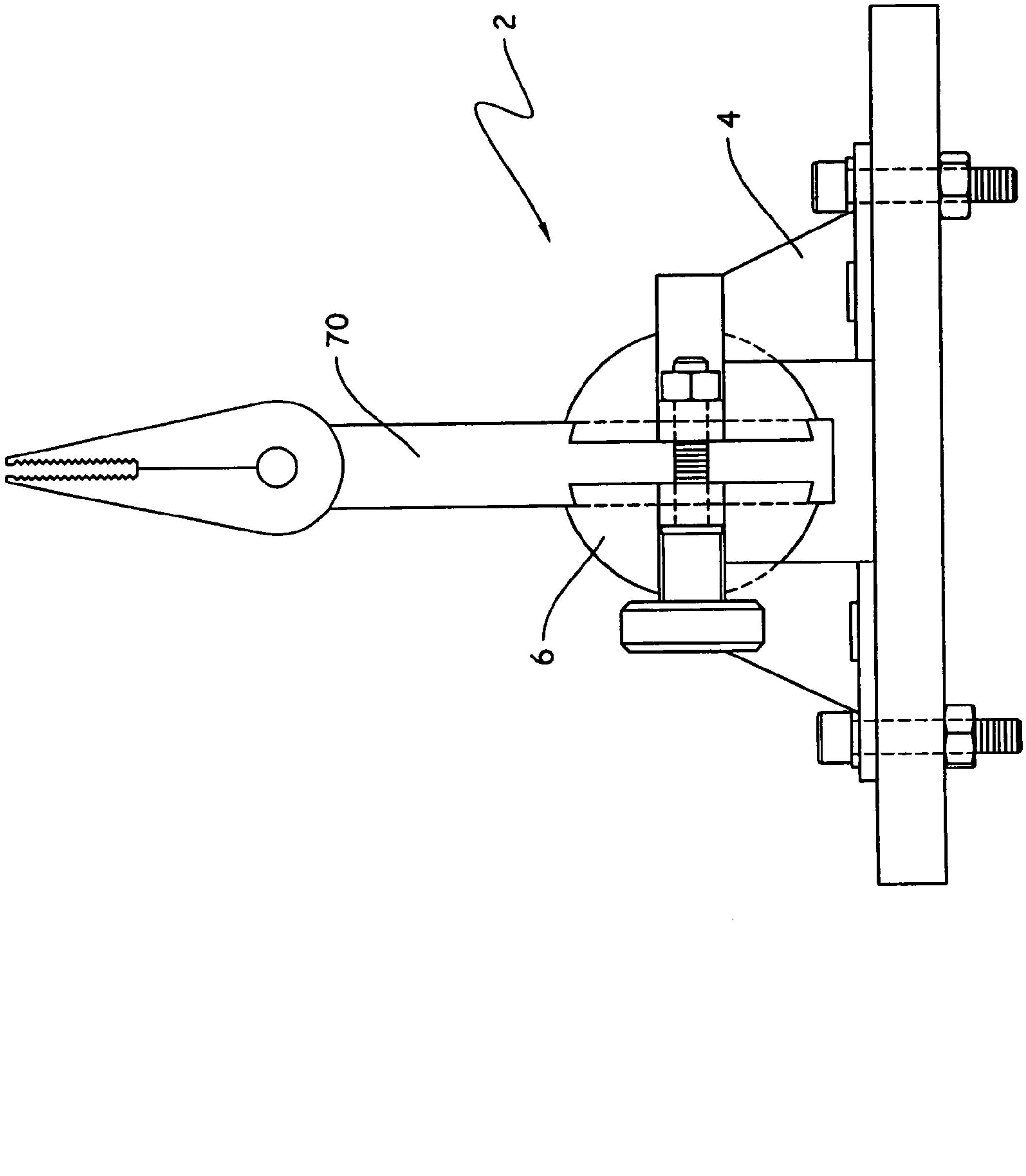
FIG. 11 is a side view of the universal work stand with a vise inserted into the ball.

FIG. 11 is a side view of the universal work stand 2 with a vise 70 inserted into the opening 8 ball 6.

Figure 12:
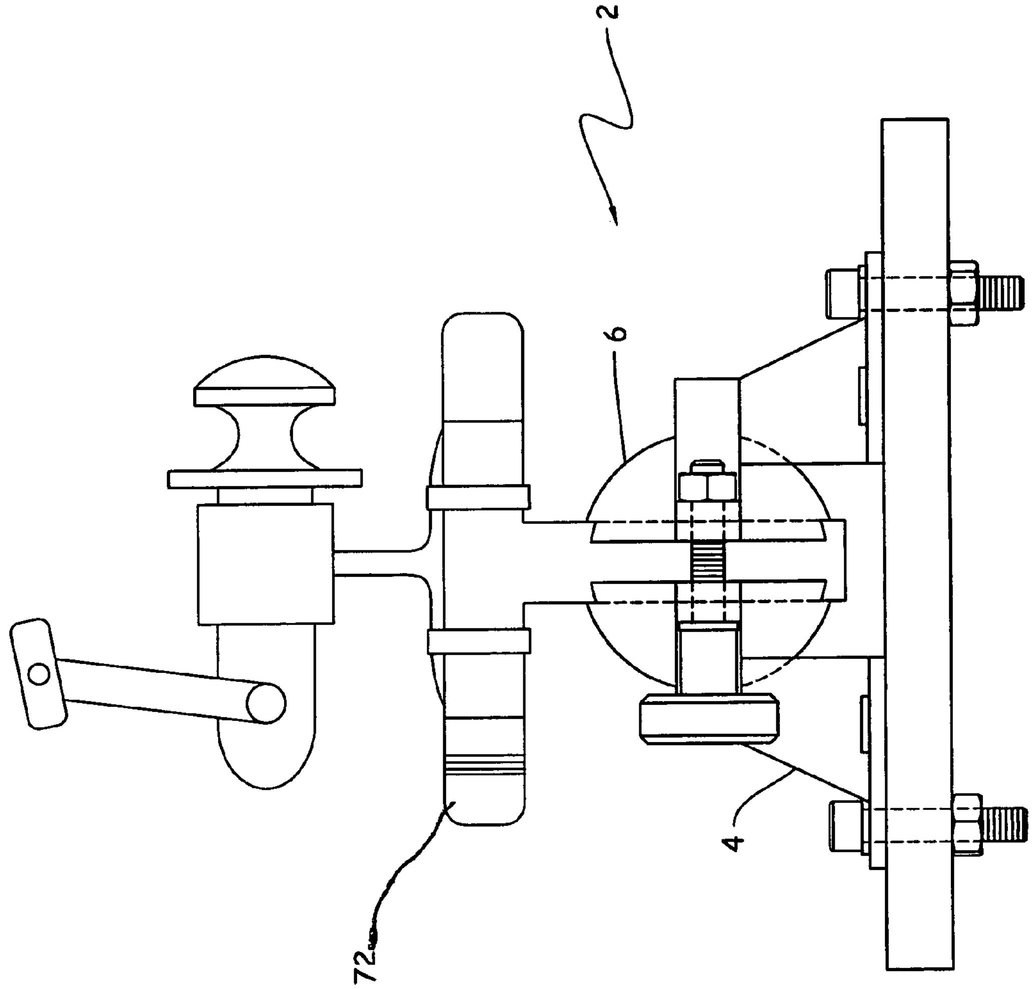
FIG. 12 is a side view of the universal work stand with a reel holding device insert into the ball.

FIG. 12 is a side view of the universal work stand 2 with a reel holding device 72 inserted into the ball 6.

Figure 13:
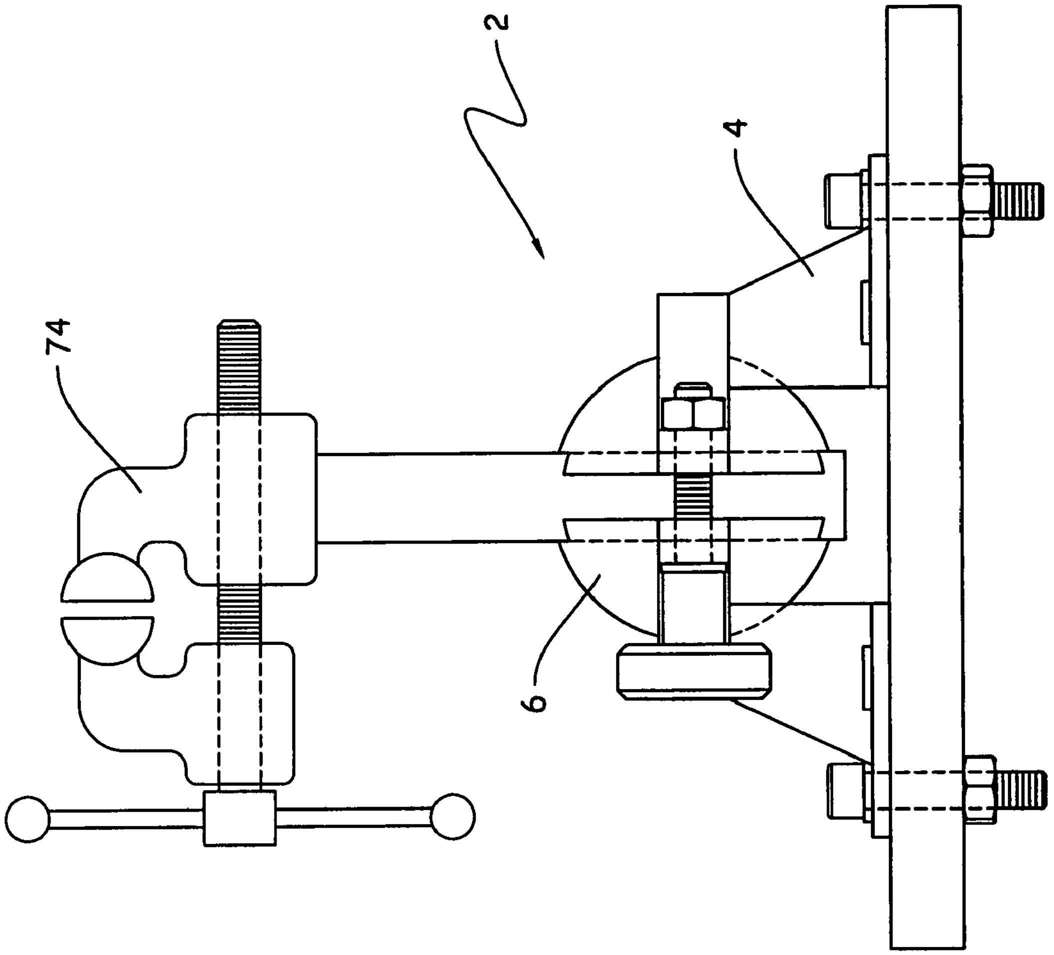
FIG. 13 is a side view of the universal work stand with a work vise inserted into the ball.

FIG. 13 is a side view of the universal work stand 2 with a work vise 74 inserted into the ball 6.

Figure 14:
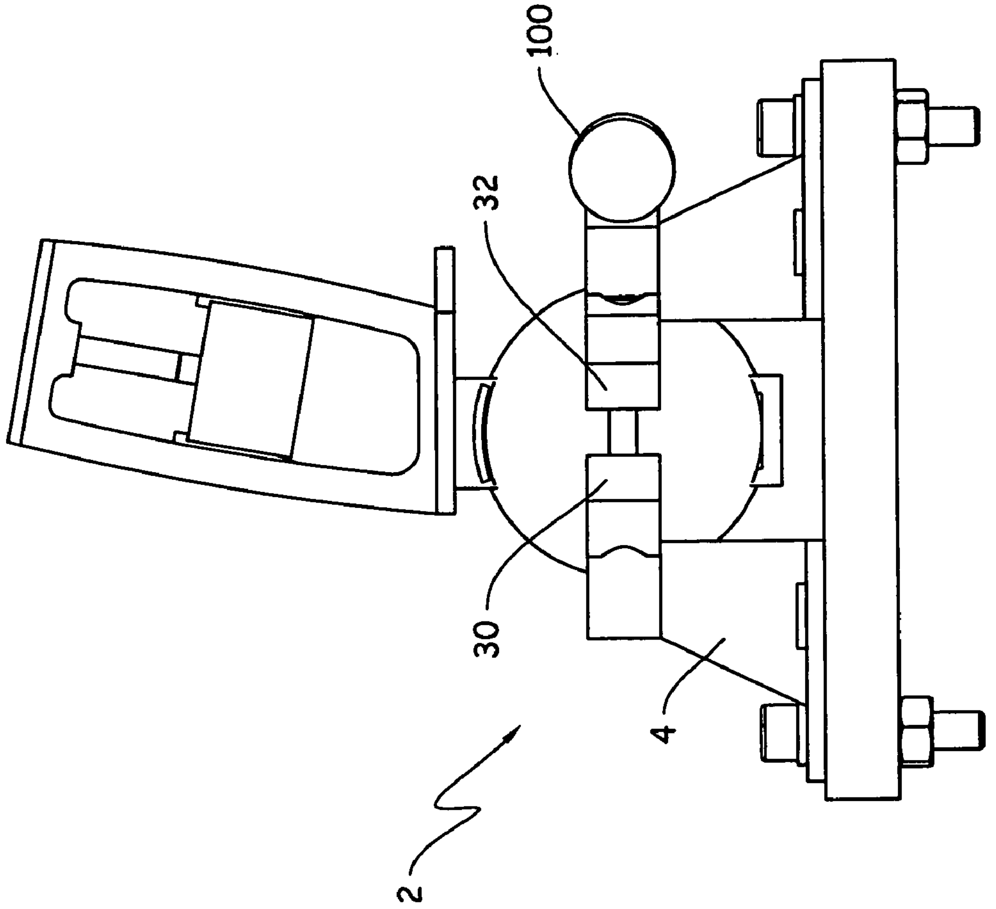
FIG. 14 is a rear view of the universal work stand with the quick release ball lock mechanism.

FIG. 14 is a rear view of the universal work stand 2 with the quick release ball clamping mechanism 100.

Figure 15:
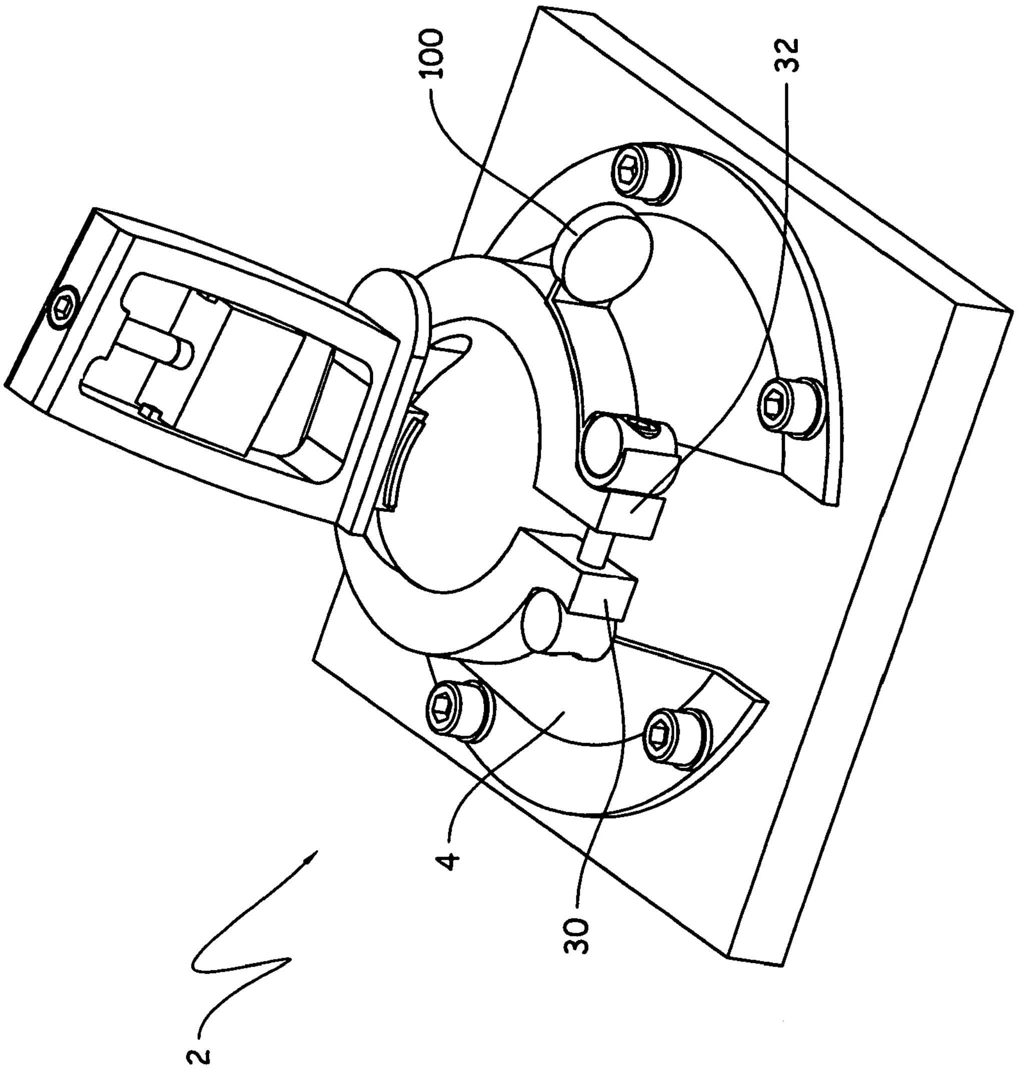
FIG. 15 is another rear view of the universal work stand with the quick release ball lock mechanism.

FIG. 15 is another rear view of the universal work stand 2 with the quick release ball clamping mechanism 100.

Figure 16:
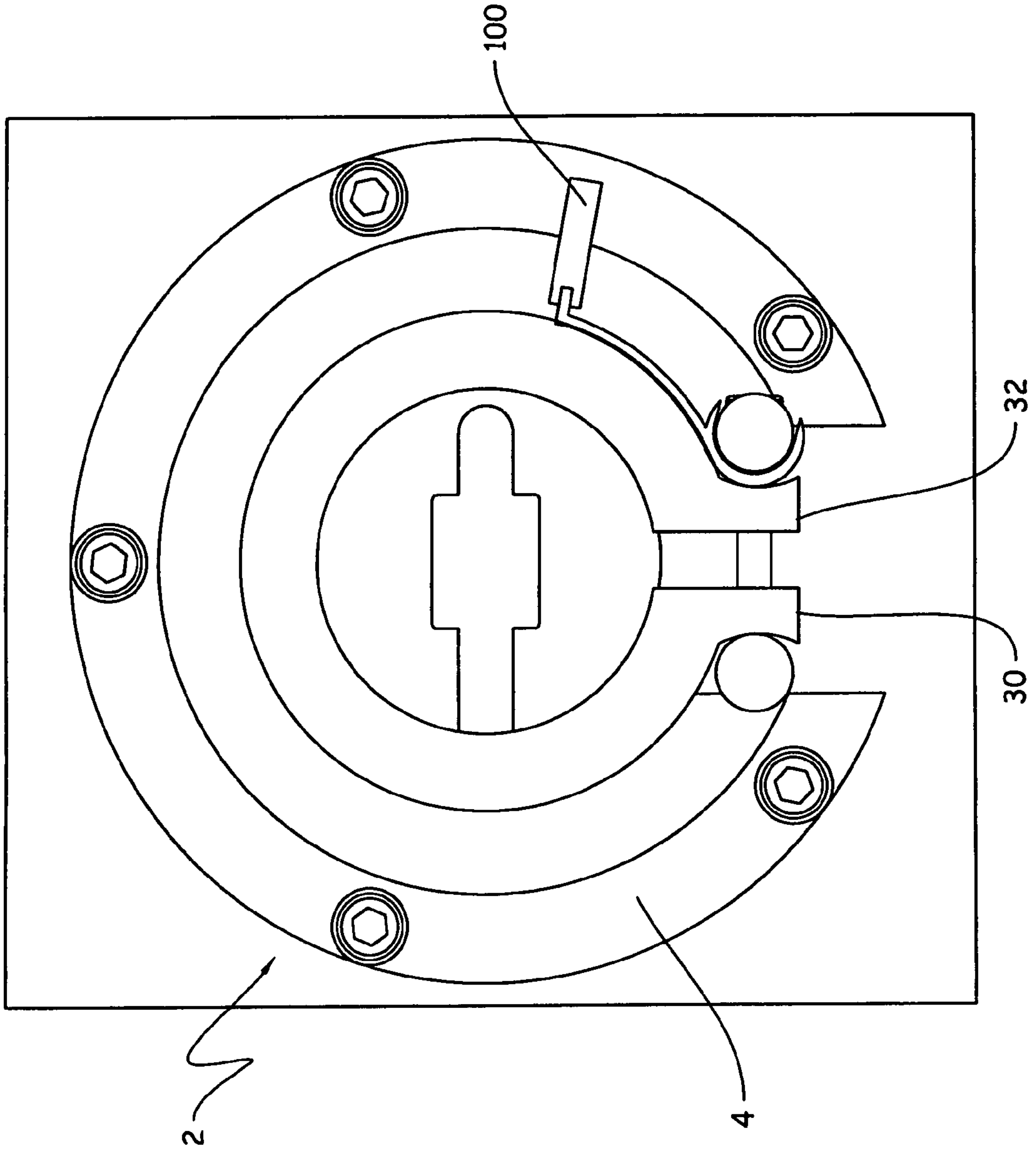
FIG. 16 is a top view of the universal work stand with the quick release ball lock mechanism.

FIG. 16 is a top view of the universal work stand 2 with the quick release ball clamping mechanism 100.

The ball 6 is configured to accept a plurality of work piece holders 10 such as a firearm holder, a fly tying vise 66, a reel vise (for holding fishing reels), fishing rod holder 68, pistol barrel holder 64, model vise 70, a circuit board holder 70 or any other vise configuration that will hold a work piece. The unique pivoting ball allows for the manipulation of the ball to aid in the worker in placing the work at various angles. The ball lock is a standard locking mechanism and is also available with a quick release that can be adjusted with one hand while the other secures the work piece or the holder.

What is claimed is:

1. A universal work stand, said work stand comprising in combination:

a base;

rotatably mounted in said base, a ball, said ball having a centered opening therein to receive a shaft;

an independent, insertable holder, said holder comprising a bottom shaft portion insertable in said ball centered opening, said holder having a top half capable of holding a workpiece, said top half being a rectangular frame having two long rails, a top rail and a bottom rail, said frame capable of fitting into a handgun handle, said base having a means of restraining any movement of the ball in the base, said means being capable of release to permit movement of the ball.

2. A universal work stand as claimed in claim 1 wherein the top half has a means of restraining the handgun against movement.

3. A universal work stand as claimed in claim 2 wherein the means is comprised of a moveable wedge retained between the two long rails and is moveable by a threaded rod, said threaded rod having a near end and a distal end, the distal end being rotatably fixed into an opening in the wedge and the near end having a drive means to rotate the threaded rod through the top rail.

4. A universal work stand as claimed in claim 1 wherein the top half is a shaft.

5. A universal work stand as claimed in claim 1 wherein the top half is a clamping apparatus.

6. A universal work stand as claimed in claim 1 that is manufactured from metal.

7. A universal work stand as claimed in claim 6 wherein the metal is steel.

8. A universal work stand as claimed in claim 7 wherein the steel is stainless steel.

9. A universal work stand as claimed in claim 6 wherein the metal is cast iron.

10. A universal work stand as claimed in claim 6 wherein the metal is aluminum.

11. A universal work stand as claimed in claim 1 that is manufactured from plastic.

12. A universal work stand as claimed in claim 1 that is manufactured from wood.

13. A universal work stand as claimed in claim 1 that is manufactured from a combination of metal and plastic.

* * * * *